United States Patent [19]

Nodfelt

[11] Patent Number: 4,884,861
[45] Date of Patent: Dec. 5, 1989

[54] METHOD OF OPTICAL CONNECTION OF AN END PORTION OF AN OPTICAL FIBRE WITH AN OTHER OPTICAL ELEMENT

[75] Inventor: Ingvar Nodfelt, Löddeköpinge, Sweden

[73] Assignee: AB Stratos, Gnosjo, Sweden

[21] Appl. No.: 154,507

[22] Filed: Feb. 5, 1988

Related U.S. Application Data

[63] Continuation of Ser. No. 875,465, Jun. 18, 1986, abandoned.

[30] Foreign Application Priority Data

Mar. 19, 1986 [SE] Sweden .............................. 8601277

[51] Int. Cl.$^4$ .............................................. G02B 6/32
[52] U.S. Cl. ................................. 350/96.18; 350/96.21
[58] Field of Search .............. 350/96.18, 96.20, 96.21, 350/96.22

[56] References Cited

U.S. PATENT DOCUMENTS

| | | | |
|---|---|---|---|
| 4,215,937 | 8/1980 | Borsuk .................. | 350/96.18 X |
| 4,265,511 | 5/1981 | Nicia et al. ............. | 350/96.2 X |
| 4,289,374 | 9/1981 | Franken et al. ......... | 350/96.2 |
| 4,303,301 | 12/1981 | Teichert et al. ......... | 350/96.18 |
| 4,691,985 | 9/1987 | Shank et al. ........... | 350/96.18 |
| 4,711,518 | 12/1987 | Shank et al. ........... | 350/96.20 |
| 4,718,744 | 1/1988 | Manning .................. | 350/96.20 |
| 4,733,936 | 3/1988 | Mikolaicyk et al. .... | 350/96.21 |
| 4,770,488 | 9/1988 | Shank et al. ........... | 350/96.20 |

FOREIGN PATENT DOCUMENTS 2145534A 3/1985 United Kingdom ............... 350/96.2

*Primary Examiner*—John D. Lee
*Attorney, Agent, or Firm*—Albert L. Jeffers; David L. Ahlersmeyer

[57] ABSTRACT

In a method of optically connecting an end portion of an optical fibre with an other optical element the end portion of the optical fibre is connected with a lense. The connection is provided by fixing the lense in a connector element, the optical axis of the lense and the axis of a surface of revolution constituting a reference surface of the connector element being thereby provided in a coinciding position. The end portion of the optical fibre is fixed in a sleeve shaped element with the end portion of the fibre in a centered position in relation to a surface of revolution constituting a reference surface of the sleeve shaped element. The sleeve shaped element and the optical fibre fixed therein are then connected with the connector element while said reference surfaces are moved into engagement with each other. Thereby the lense and the end portion of the optical fibre are optically centered in a correct position in relation to each other. (FIG. 1).

4 Claims, 3 Drawing Sheets

METHOD OF OPTICAL CONNECTION OF AN END PORTION OF AN OPTICAL FIBRE WITH AN OTHER OPTICAL ELEMENT

This is a continuation of application Ser. No. 875,465 filed June 18, 1986, now abandoned.

The present invention relates to a method of optical connection of an optical fibre with an other optical element, for example an end portion of an other optical fibre.

From certain points of view it is advantageous to include a lense system in an arrangement for connecting an end portion of an optical fibre with an other optical element, for example an other optical fibre. Thereby, the most important advantage is that the sensitivity to dirt at the point of connection is substantially reduced because of the fact that the magnification of the cross-sectional size of the optical signals provides that the dirt will occupy a smaller portion of the connection surface. Thereby, it is of great importance for providing a connection having as small losses as possible that the lenses are connected with the end portions of the optical fibres in a correct way. According to the previously known technique this connection is provided by fixing the fibre ends to the surfaces of the lenses by means of an adhesive. This technique is accompanied by several drawbacks as it does not provide the desired accuracy with regard to the requirement that the optical axis of the lense shall coincide with the optical axis the fibre and is a technique which can not be used by the customer at the place where the connection shall be provided.

The object of the invention is to provide an improved and simplified method of such an optical connection of an end portion of an optical fibre with an other optical element, for example an end portion of an other optical fibre, in which the connection arrangement comprises a lense.

The method according to the invention comprises the steps of fixing the lense in a connector element, positioning the optical axis of the lense and the axis of a surface of revolution forming a reference surface of the connector element in a coincidence position, fixing the end portion of the optical fibre in a sleeve shaped element with the end portion of the fibre centered in relation to a rotational surface forming a reference surface of the sleeve shaped element and connecting the sleeve shaped element with the optical fibre fixed therein with the connector element by positioning said reference surfaces in engagement with each other, the lense and the end portion of the optical fibre being thereby optically centered in relation to each other.

In a preferred embodiment of the method according to the invention the position of the connector element is adjusted after the fixing of the lense in the connector element in such a way that the optical axis of the lense coincides with a rotation axis of the connector element and that the reference surface of the connector element is thereupon provided by means of working, preferably turning, of the connector element while the connector element is rotated around said rotational axis. The adjustment of the position of the connector element and the lense fixed thereto in a position in which the optical axis of the lense coincides with the axis with regard to which the connector element is rotatable is preferably provided by transmitting light through the lense and by adjusting the position of the connector element until the light emitted from the lense forms a stationary picture while the connector element is rotated around said axis.

It is realized that the positioning of the optical axis of the lense so that it coincides the axis of the rotational reference surface of the connector element is conducted in a factory, whereupon the connection of the end portion of the optical fibre with an other optical element can be provided according to principles known per se by fixing the end portion of the optical fibre in the sleeve shaped element and connecting the sleeve shaped element with the optical fibre fixed therein with the connector element provided with the lense, whereupon the lense is optically connected with said second optical element. It is also realized that the steps last mentioned can be conducted at a place where the connection shall be provided.

Thus, the working steps which have to be conducted at the work place can be conducted without special equipment or special education. In spite thereof there is according to the method of the invention provided an optical connection in which the losses are substantially less than in connections prepared by means of previously known technique.

The invention is described in the following with reference to the accompanying drawings.

Figure 1:
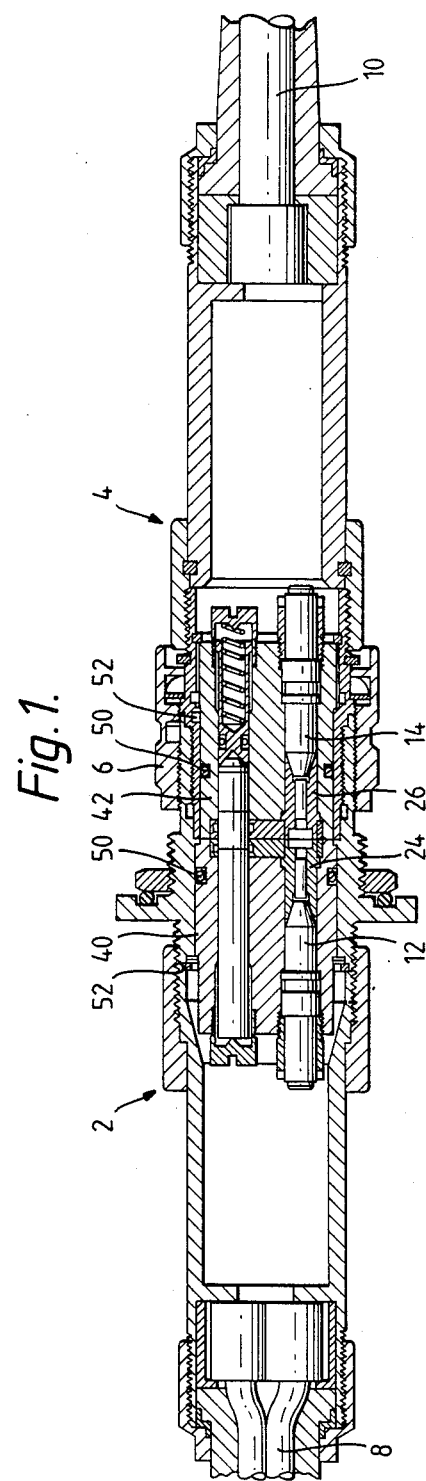
FIG. 1 is an axial section of a connector assembly for optical fibres provided according to the principals of the method of the invention.

In FIG. 1 there is shown a connector assembly by means of which an end portion of a first optical fibre is connected with an end portion of a second optical fibre. The connector assembly shown in FIG. 1 comprises a first connector element 2 and a second connector element 4. The connector elements 2 and 4 are connected with each other by means of a conventional collar nut 6 which is rotatably connected with the connector element 4 and is threaded unto an outer thread of the connector element 2. A fibre cable 8 is connected with the connector element 2 and a fibre cable 10 is connected with the connector element 4. The fibre cables 8 and 10 constitute the two end portions of said first and said second optical fibres which are connected with each other by means of the connector assembly shown in FIG. 1. The connector assembly shown in FIG. 1 provide the connection of only one couple of end portions of optical fibres, but it is realized that the connector assembly can be constructed so as to provide connection of two or several pairs of end portions of optical fibres. The first optical fibre extends from the fibre cable 8 in a way not shown, to a sleeve shaped element 12 of the first connector element 2, while the second optical fibre extends from the fibre cable 10 in a way which is not shown in the drawing, to a sleeve shaped element 14 of the second connector element 4. The sleeve shaped elements 12 and 14 are of the kind shown and described in the Swedish Pat. No. 426 882. Thus, each of the sleeve shaped elements 12 and 14 has an outer conical reference surface 16 and 18, respectively, the end portions of the optical fibres being centered in relation to the reference surfaces of the sleeve shaped elements 12 and 14. The conical reference surfaces 16 and 18 engage complementary, conical inner surfaces 20 and 22, respectively, of the connector elements 24 and 26, respectively. In each connector element 24 and 26 there is positioned a lense 28 and 30, respectively. The lenses 28 and 30 are connected with each of the connector elements 24 and 26 in such a way that the optical axes of the lenses are positioned exactly on the axes of the conical inner surfaces 20 and 22.

Because of the fact that each of the conical reference surfaces 16 and 18 engages one of the conical inner surfaces 20 and 22 and the end portions of the optical fibres and the lenses are centered in relation to said surfaces there is also provided a correct mutual relationship between the end portions of the optical fibres and the adjacent lense.

On the side of the lenses 28 and 30 opposite from the sleeve shaped elements 12 and 14 the connector elements 24 and 26 are provided with transparent protecting elements 32 and 34.

The connector elements 24 and 26 have substantially cylindrical outer surfaces 36 and 38 which are concentric with each of the conical inner surfaces 20 and 22 and each of the lenses 28 and 30. The cylindrical outer surfaces 36 and 38 engage with pressfit bores in insert portions 40 and 42. The insert portions 40 and 42 are correctly positioned in relation to each other by means of guide pins of which only one guide pin 44 is visible in FIG. 1. The guide pin 44 is fixed in the insert element 40 and engages a boring in the insert element 42 in order to provide the correct mutual relationship between the insert portions 40 and 42. The guide pin 44 has a conical end portion 46 engaging a complementary conical recess in a resilient engagement element of the insert portion 42.

When the connector elements 2 and 4 are connected with each other according to FIG. 1 there is, as described above, provided such a positioning of the end portions of the optical fibres and the lenses between themselves and in relation to each other that there is provided a connection between the fibre end portions, which has very small losses. Thus, the light signal from one of the fibre end portions is transferred to the other fibre end portion through the lenses 28 and 30 and because of the fact that there is transferred a light signal having a magnified cross-section there is provided a reduction of the detrimental effects of dirt in the connection.

Figure 2:
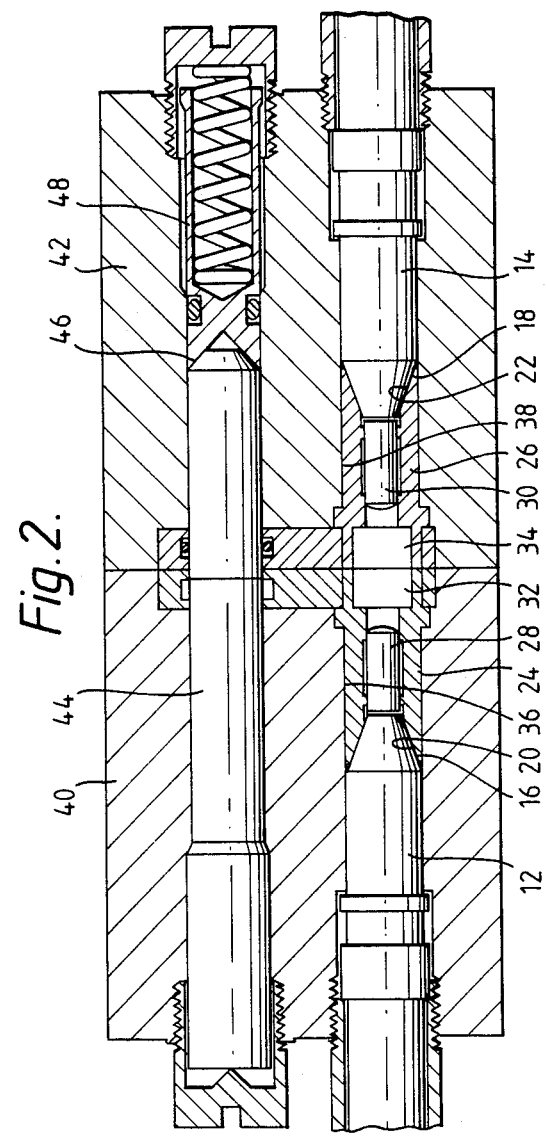
FIG. 2 is an axial section on an enlarged scale of a portion of the connector assembly according to FIG. 1.

In FIG. 2 there is shown a cross-section of an enlarged scale of the insert portions 40 and 42 and the elements thereof described with reference to FIG. 1.

In order to obviate the transfer of such forces, for example bending forces, to which the outer surfaces of the connector elements 2 and 4 are subjected to the inner portions of the connector assembly the insert elements 40 and 42 are resiliently or in a floating way suspended in the connector elements 2 and 4 by means of O-rings 50 and corrugated springs 52.

Figure 3:
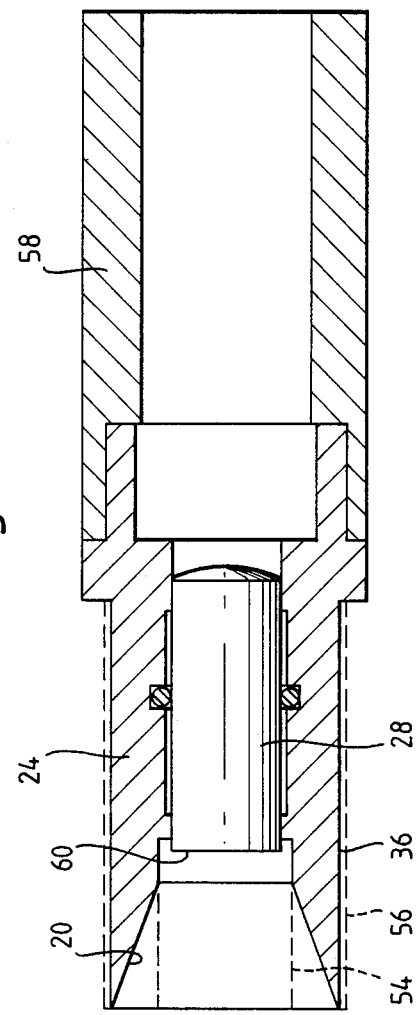
FIG. 3 is an axial section of a portion of the connector assembly according to FIG. 1 and also including the portion thereof shown in FIG. 2 illustrating the conducting of the method according to the invention.

FIG. 3 illustrates the method according to the invention for providing the correct position of the lense 28 in the connector element 24 in relation to the conical inner surface 20 and the cylindrical outer surface 36 of the connector element. The method of providing the correct positioning is valid also in respect to the connector element 26 and the lense 30 thereof.

Before the method according to the invention is initiated the connector element 24 is defined by the cylindrical inner surface 54 shown in broken lines instead of by the conical inner surface 20 and by the cylindrical outer surface 56 also shown in broken lines instead of the cylindrical outer surface 36. After the lense 28 has been fixed in the connector element 24 the connector element is connected with a retainer element 58. The retainer element 58 is rotatably supported in a working machine. The retainer element is supported in the working machine in such a way that the retainer element and thereby the connector element 24 are movable along two axes extending transversely of the rotation axis of the retainer element and the connector element so that the retainer element 58 and the connector element 24 can be adjusted to desired position in relation to said axis of rotation. Light is supplied to the lense 28 from the right in FIG. 3, the light beam leaving the lense from the left end surface 60 thereof in FIG. 3. The focus of the lense 28 thereby being positioned outside the lense to the left of the end surface 60. The light beam from the lense 28 is projected on a surface, for example the surface of a sensing device. Thereupon the retainer element and therewith the connector element 24 are rotated, whereby it is possible to establish if the optical axis of the lense coincides with the rotational axis. If this is not the case the projection of the light beam will conduct a circular motion. The retainer element 58 with the connector element 24 is adjusted along the axes extending transversely of the rotational axis until the projection of the light beam is stationary, which means that the optical axis of the lense 28 coincides with the rotational axis. The surfaces 54 and 56 are thereupon machined while the retainer element 58 and the connector element 24 are rotated using the same rotational axis as previously used by means of turning. Thereby the conical inner surface 20 and the outer cylindrical surface 36 are formed in such a way that the axes of said surfaces will exactly coincide with the optical axis of the lense 28. When using the conical inner surface 20 and the cylindrical outer surface 36 for connecting the connecting element 24 with the sleeve shaped element 12 and the insert element 40 there is provided an exactly correct positioning of the lense in relation to the end portion of an optical fibre fixed in the sleeve shaped element 12.

I claim:

1. A method of optically connecting an end portion of a first optical fibre with an other optical element, such as an end portion of a second optical fibre, in which the end portion of the first optical fibre is optically connected with a first lens that in turn is optically connected with said other optical element, such as the end portion of a second optical fibre through a second lense, comprising the steps of:

providing a connector element including a surface of revolution about an axis, the surface of revolution constituting a reference surface of the connector element;

fixedly placing the first lense in the connector element such that the optical axis of the first lense and the axis of the surface of revolution of the connector element coincide, said step of fixedly placing the first lense in the connector element being performed by positioning the connector element, with the first lense placed therein, such that the optical axis of the first lense coincides with an axis of revolution of the connector element, and then forming the reference surface of the connector element while the connector element is rotated around the axis of revolution, said reference surface being formed by machining, preferably turning;

fixing the end portion of the first optical fibre in a sleeve-shaped element such that the end portion is centered in relation to a surface of revolution constituting a reference surface of the sleeve-shaped element; and connecting the sleeve-shaped element with the connector element such that the reference surface of the sleeve-shaped element and the reference surface of the connector element are in engagement with each other in accordance with a single predetermined orientation, whereby the first lense and the end portion of the first optical fibre are optically centered in relation to each other without further adjustment.

2. The method of claim 1 in which:

said step of positioning the connector element is performed by transmitting light through the first lense and adjusting the position of the connector element until a light beam leaving the first lense constitutes a stationary picture when the connector element and fixed first lense is together rotated.

3. The method of claim 2 in which:

the reference surface of the connector element is formed as an inner conical surface.

4. A method of optically connecting an end portion of a first optical fibre with an other optical element, such as an end portion of a second optical fibre, in which the end portion of the first optical fibre is optically connected with a first lense that in turn is optically connected with said other optical element, such as the end portion of a second optical fibre through a second lense, comprising the steps of:

providing a connector element including a surface of revolution about an axis, the surface of revolution constituting a reference surface of the connector element;

fixedly placing the first lense in the connector element such that the optical axis of the first lense and the axis of the surface of revolution of the connector element coincide;

fixing the end portion of the first optical fibre in a sleeve-shaped element such that the end portion is centered in relation to a surface of revolution constituting a reference surface of the sleeve-shaped element; and connecting the sleeve-shaped element with the connector element such that the reference surface of the sleeve-shaped element and the reference surface of the connector element are in engagement with each other in accordance with a single predetermined orientation, the first lense being placed in the connector element such that the focus thereof is positioned on the optical axis of the first optical fibre and on an end surface of the end portion of the first optical fibre after the connection of the sleeve-shaped element to the connector element, whereby the first lense and the end portion of the first optical fibre are optically centered in relation to each other without further adjustment.

* * * * *